(12) United States Patent
Dewimille et al.

(10) Patent No.: US 6,455,118 B1
(45) Date of Patent: Sep. 24, 2002

(54) FLEXIBLE PIPELINE HAVING A DUAL-LAYER SHEATH OF POLYMER

(75) Inventors: Bernard Dewimille, Corbeil Essonne (FR); Jean Hardy, Barentin (FR); Jacques Jarrin, Nanterre (FR); Alain Driancourt, L'Hay les Roses (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/208,573

(22) Filed: Dec. 10, 1998

(30) Foreign Application Priority Data

Dec. 10, 1997 (FR) .............................. 97 15744

(51) Int. Cl.$^7$ ...................... B29D 22/00; B29D 23/00; B32B 1/08; F16L 11/00; F16L 9/14

(52) U.S. Cl. ................... 428/36.91; 428/36.9; 428/421; 428/474.9; 428/475.8; 428/476.3; 428/480; 138/137; 138/141

(58) Field of Search .............................. 428/36.9, 36.91, 428/36.6, 922, 421, 422, 474.4, 474.9, 475.2, 475.8, 476.3, 480; 138/137, 140, 141, 118; 206/524.5

(56) References Cited

U.S. PATENT DOCUMENTS

| 3,945,867 A | * | 3/1976 | Heller, Jr. et al. ........... 156/143 |
| 4,330,017 A | * | 5/1982 | Satoh et al. ................ 138/126 |
| 4,800,109 A | | 1/1989 | Washizu ..................... 428/34.9 |
| 5,085,905 A | * | 2/1992 | Beck ......................... 428/35.9 |
| 5,472,784 A | * | 12/1995 | Rober et al. ................. 428/421 |
| 5,510,160 A | * | 4/1996 | Jadamus et al. ......... 428/36.91 |
| 5,554,426 A | * | 9/1996 | Rober et al. ............. 428/36.91 |
| 5,934,335 A | * | 8/1999 | Hardy ......................... 138/131 |
| 6,027,779 A | * | 2/2000 | Campbell et al. ........ 428/36.91 |

FOREIGN PATENT DOCUMENTS

| DE | 4302628 | | 8/1994 | |
| EP | 0730115 | | 9/1996 | |
| GB | 2318399 | | 4/1998 | |
| JP | 6286079 | * | 10/1994 | ........... B29D/23/22 |
| WO | 9621820 | | 7/1996 | |
| WO | 9728393 | | 8/1997 | |

OTHER PUBLICATIONS

WPI Database, Section Ch, Week 9445 Derwent Publications Ltd. London, GB; Class A18.

* cited by examiner

*Primary Examiner*—Harold Pyon
*Assistant Examiner*—Michael C. Miggins
(74) *Attorney, Agent, or Firm*—Antonelli, Terry, Stout & Kraus, LLP

(57) ABSTRACT

The present invention relates to a reinforced flexible pipeline for conveying an effluent, the pipeline having a sheath (2, 3) of polymer, the internal surface of which is in contact with the effluent and the external surface of which is in contact with reinforcing wires (4) when under pressure.

The sheath has an internal layer (2) of polymer or copolymer with no external plasticizer and an external layer (3) of polymer possibly containing plasticizers so as to obtain given mechanical characteristics.

Application of the pipeline proposed by the invention for conveying an effluent under pressure and at high temperature.

6 Claims, 1 Drawing Sheet

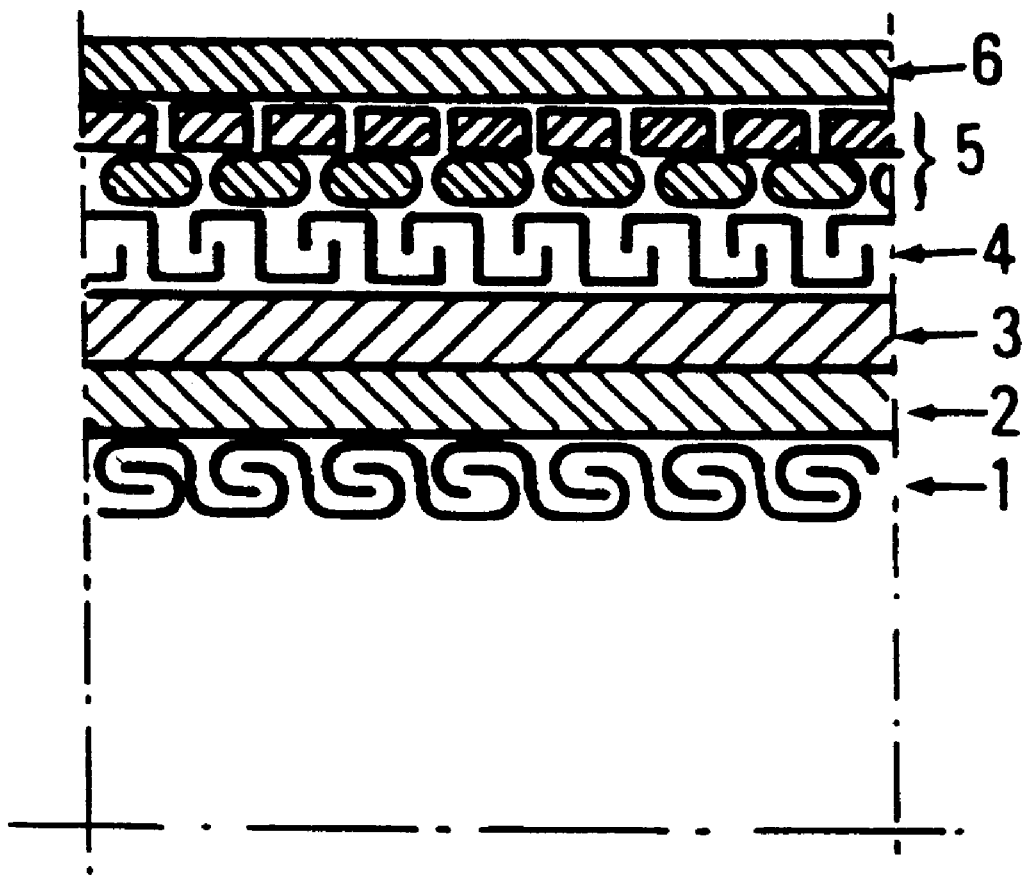

FLEXIBLE PIPELINE HAVING A DUAL-LAYER SHEATH OF POLYMER

The present invention relates to the field of flexible pipelines used in petroleum exploration. These pipelines are used on the one hand to provide connections between the sea bed where the well head is located and the surface where an oil platform is generally installed in order to treat and dispatch production. They are generally used on the other hand to convey the effluent produced by wells, in the form of liquid or gaseous products, between a storage or processing site and the point at which it will be used. These flexible pipelines therefore convey the petroleum output and any products which might be associated with it (liquid crude oil and/or gas, under pressure and at high temperature, as well as various other fluids such as oil, methanol, . . . ).

The general structure of flexible pipelines is specifically described in document API RP 17B (First Edition Jun. 1, 1988). The flexible tubular pipelines are generally made from different elements starting from the axis of the pipe out towards the exterior, including:
- a flexible metal tube, referred to as the internal frame, made from at least one section, the turns of which are stapled to one another,
- a polymer sealing sheath,
- at least one layer of reinforcing forming a pressure-resistant casing due to its small-pitch spiral design,
- at least one layer of traction-resistant reinforcing wound spirally at an elongate pitch,
- in the case of a flexible pipe which does not have a shell, a layer of reinforcing crossed at an angle of approximately 55°,
- other external or intermediate sealing sheaths.

The specification for polymer sealing sheaths used to cover the frame is generally one which is particularly difficult to meet because it has to provide a seal for the flexible tubes since it will be in direct contact with the products being transported which are under pressure and at high temperature. Essentially, this sheath:
- may be made by continuous extrusion, possibly directly onto the internal frame as a base,
- must be sufficiently flexible to cope with the curvature imposed on flex-pipes during manufacturing operations and on-site laying (swell movement or lifting of the flexible line in preparation for a move to another site),
- must have a high resistance to creep in order to cope with the force of pressure, which is aggravated by the level of the temperature. Creep occurs in the jointing (spacing or clearance) between the metal reinforcement (for example self-locking zeta or T) against which the sheath bears when the pipe is placed under pressure by the effluent conveyed,
- must be sufficiently chemically stable to ensure that there is no latent deterioration in its mechanical properties and sealing capacity during the service life of the flex-pipe.

The criteria governing the choice of materials which may be used to make the sheaths, particularly if service temperatures are likely to reach or even exceed 130° C., limits the number of possible materials significantly. The various manufacturers generally offer three types of material for these applications.

Polyolefins (polyethylene of average density) are compatible with the specifications listed above but their creep resistance is limited at high temperatures, especially in the presence of liquid hydrocarbons, which are absorbed by these materials to a high degree. The maximum operating temperature for polyethylenes is around 60° C. in the absence of gas.

Of the polyamide family, only polyamides 1 and 12 have sufficient chemical resistance for use in these applications. The resistance of polyamides to hydrolysis limits their service life to about twenty years in temperatures of about 90° C. in the presence of crude oil and gas. In the presence of water, their useful life is shorter and will then depend on the temperature and acidity conditions. The degree of flexibility demanded of sheaths incorporated in a flexible pipe structure for use in these applications makes it necessary to include a plasticizer product (external plasticization) to make these materials more flexible.

At temperatures in excess of 90° C., vinylidene fluoride homopolymers are used for their high chemical inertia. The mechanical behaviour, particularly in terms of creep resistance, restricts their use to temperatures below 130° C. As with polyamide homopolymers, the level of flexibility which is vital to cope with the movements imposed on flexible pipelines is such that materials of this type have to be plasticized (external plasticization).

This plasticization, referred to as external, is effected by mechanically mixing the polymer with components with a low molecular mass, which increases the elastic deformation limit of the material. Under certain conditions, however, these low-mass compounds may dissolve in the crude oils which come into contact with the sealing sheath. As they gradually lose their plasticizer, these materials exhibit a lower capacity of elastic deformation and risk becoming too susceptible to cracking when the flex-pipe is subjected to movement.

Manufacturers of flexible pipeline propose systems comprising multiple layers of a same material, for example plasticized double-layer or triple-layer PVDF or plasticized polyamide. The first layer in direct contact with the petroleum is considered as dispensable and may lose its plasticizer and even crack. Since the second layer is not in direct contact with the petroleum, it retains its plasticizer and flexibility and continues to provide sealing functions and mechanical resistance in terms of creep strength. It is clear that the more resistant the sheath has to be to pressure and creep at the joints between the reinforcing, the thicker the superposed layers must be. In certain applications, multiple layers are known which are made up of two different materials such as plasticized PVDF as an internal sheath and plasticized polyamide as an external sheath. However, these systems give rise to problems as regards the compatibility between the different constituent materials, particularly at high temperature.

With multiple-layered sheaths of this design, the two main functions are not dissociated from one another: chemical resistance (resistance to ageing and the loss of plasticizers) and mechanical resistance particularly as regards creep in the spacing between the pressure-resistant reinforcing and other reinforcing.

Surprisingly, it has now been found possible to dissociate the functions of mechanical creep resistance and chemical resistance and to manufacture, at a lower cost, sealing sheaths which meet the specifications for flexible pipelines, even as far as broadening their potential applications, using materials which, individually, do not meet all the requisite specifications. This being the case, both methods are used to plasticize polymer materials, internal plasticization (flexibility obtained by grafting or polymerisation of monomers, making the polymer chain more flexible, but which are still free to migrate) and external plasticization (increased flexibility by a physical addition or admixture of plasticizers which are more or less free, and hence extractible, depending on the environment).

Creep in the jointing spaces between the metal reinforcing (clearance between 0 and approximately 5 mm) represents one of the current limitations on polymer materials for use in a single-material sealing sheath. In fact, it is generally felt that once the volume of substance which has penetrated the jointing space has formed a sub-thickness of 30% of the thickness of the initial sheath, there is a risk that the radius of curvature of the pipeline (blocking) will be limited but also that the build-up of strain will make the plastic sheath susceptible to the onset of cracking. On a sheath with a single layer, these risks are unacceptable and the dimensions of the sheath are chosen accordingly. Choosing the right material for the external layer (specified for mechanical resistance) can specifically overcome this problem.

The present invention, therefore, relates to reinforced flexible piping for petroleum exploration, in which the sealing sheath consists of at least two layers of an extruded thermoplastic material. In the sheath:

the external layer, relative to the axis of the tube, is made from a polymer or copolymers of given mechanical characteristics, possibly plasticized internally or externally;

the layer inside the one described above is made from a polymer or copolymer with no external plasticizer. The polymer or copolymer with no external plasticizer in the internal layer may be selected from among the group comprising:

the homopolymers or copolymers of ethylene and/or alpha olefins, for example the polyethylenes or polypropylenes;

the polymers of vinylidene fluoride or the copolymers of vinylidene fluoride $CF_2=CH_2$ and at least one monomer of the type $CF_2=CFX$, where X may be F, Cl, Br, $CF_3$ to $C_5F_{11}$;

the copolymers of tetrafluoroethylene with monomers of the type $CF_2=CF\_O\_R$, where R may be $CF_3$(MFA), $C_2F_5$, $C_3F_7$(PFA), $C_4F_9$, $C_5F_{11}$;

the copolymers of ethylene with TFE or CTFE;

the polyketones.

The polymer of the external layer may be selected from the group comprising polyamide 11 or 12 and PVDF.

The polymer of the external layer may have a mechanical strength such that the shear modulus of the polymer may be greater than 30 MPa for temperatures lower than approximately 140° C. and the shear modulus may be less than 1000 and preferably less than 700 MPa at temperatures in excess of −20° C.

The present invention also relates to the industrial application of the pipeline described above for conveying an effluent, generally petroleum, under pressure and at high temperatures, i.e. which may reach 180° C. but by preference not exceeding 130° C.

Like all the plastic materials used in this application, elongation at the traction threshold must be at least 5%.

The flexible plastic materials which are not externally plasticized may be of considerable interest for this pipe structure.

Incorporating comonomers in the structure of polymers (internal plasticization) effectively increases their flexibility but limits their mechanical strength, particularly a regards creep, and hence their service temperature. For example, the thermoplastic copolymers of PVDF (polyvinylidene fluoride) in which 2 to 20% by mole of monomers, such as HFP (hexafluoropropylene), CTFE (chlorotrifluoroethylene), BTFE (bromotrifluoroethylene or TFE (tetrafluoroethylene), are introduced into the structure of the base polymer, VDF (vinylidene fluoride). The flexibility of these copolymers is superior to that of the homopolymer VDF but they are mechanically limited as regards service temperature.

These materials which have good chemical resistance at high temperatures and under pressure are suitable for the internal layer which is in contact with the effluent being conveyed by the pipeline.

In the structures proposed by the invention, the external layer is by definition protected from contact with the hydrocarbons or water by the internal chemically resistant layer. Consequently, materials may be used which are optimised in terms of mechanical strength, particularly with regard to creep between the pressure-resistant reinforcing. These materials may be externally plasticized, particularly since migration of the plasticizer may be limited here due to the presence of an internal layer as proposed by the invention.

This type of structure has the advantage of separating the functions of chemical resistance and mechanical strength. In this configuration, chemical resistance over time is provided by the internal layer, which is supported the external layer which in turn provides the mechanical strength.

In manufacturing a dual-layer sealing sheath, the intention is not to join the two layers so that when the pipe is bent, the two layers will have a certain degree of longitudinal freedom relative to one another. As a result, the rigidity of the unit will not be over-increased. In particular, no bonding agent will be used and on the contrary, the exterior of the internal sheath may be coated with anti-bonding products such as talc, lubricant, etc.

The present invention will be more readily understood and its advantages seen more clearly from the following examples, which are not restrictive, illustrated by the single attached drawing, which represents a structure for a flexible pipeline as proposed by the invention.

FIG. 1 illustrates an example, which is not restrictive in any respect, of a structure incorporating a dual-layer sheath proposed by the invention. From the inside moving towards the outside of the pipe, there are:

a frame 1 consisting of a stapled sheet, for example, a first layer 2 of polymer without external plasticizer to provide resistance to chemical attack from the fluids inside but which has an acceptable flexibility in terms of the movements and displacements to which the flexible pipeline will be subjected, a second layer 3 of polymer, possibly plasticized, having an acceptable mechanical strength and flexibility whilst exhibiting resistance to creep between the spacing of the turns of the reinforcing underneath at high temperature, this creep being induced by the pressure of the fluids inside, a layer of reinforcing 4 consisting of stapled wires applied in a spiral, for example at a very small pitch, to form a pressure-resistant shell, one or more layers of traction-resistant reinforcing 5, generally laid in a spiral with a long pitch, an external sealing layer 6 of extruded polymer.

It is clear that the pressure- and traction- resistant reinforcing 4 and 5 may be arranged in different combinations of layers, depending on the nature of the application in which the flexible pipe will be used. For example, the reinforcing 4 and 5 could be replaced by two layers of reinforcing wires at 55° relative to the axis to make what would be a flexible pipe without a shell, the pressure-resistance being provided by the reinforcing laid at 55°.

EXAMPLES 1 to 6

In these examples, the layers in the structure described in relation to FIG. 1 are set out in table 1:

TABLE 1

| | Example | | | | | |
|---|---|---|---|---|---|---|
| | 1 | 2 | 3 | 4 | 5 | 6 |
| Layer 2 | fluoride copolymer 1 | fluoride copolymer 2 | plasti-cized PVDF | plasti-cized PVDF | — | — |
| Thickness (MM) | 5 mm | 5 mm | 5 mm | 5 mm | | |
| Layer 3 | plasti-cized PA11 | plasti-cized PVDF | plasti-cized PVDF | plasti-cized PA11 | plasti-cized PVDF | fluoride co-polymer 1 |
| Thickness (MM) | 5 mm | 5 mm | 5 mm | 5 mm | 10 mm | 10 mm |

The externally plasticized PVDF is made by ELF ATOCHEM, for example.

The PA11 is externally plasticized.

Fluoride copolymer 1 is a copolymer of vinylidene fluoride and hexafluoropropylene (HFP), for example Kynar 2800 manufactured by Pennwalt.

Fluoride copolymer 2 is a copolymer of vinylidene fluoride and chlorotrifluoroethylene (CTFE).

In the presence of petroleum containing 10 to 15% of water at 130° C. and at a pressure of 300 bar and regularly subjected to bending, all the tubes exhibit:

Tube 6: increased rigidity due to creep in the jointing spaces of the reinforcing.

Tube 5: increased rigidity due to de-plasticization.

Tube 4: loss of sealing capacity due to de-plasticization of the PVDF and total degradation of the PA11 layer.

Tube 3: increased rigidity due to de-plasticization and significant loss of volume which might cause problems with the end-pieces.

Tube 2: behaviour exactly the same as it was initially.

Tube 1: behaviour exactly the same as it was initially.

EXAMPLE 7, 8 and 9

In these examples, the layers of the structure described in FIG. 1 are set out in table 2:

TABLE 2

| | Example | | |
|---|---|---|---|
| | 7 | 8 | 9 |
| Layer 2 | PFA | PFA | — |
| Thickness (mm) | 5 mm | 5 mm | |
| Layer 3 | plasticized PVDF | plasticized PA11 | PFA |
| Thickness (mm) | 5 mm | 5 mm | 10 mm |

The PFA (perfluorocalcoxy) is a copolymer of tetrafluoroethylene and $CF_2=CF\_O\_C_3F_7$.

The PVDF and PA11 are identical to those used and defined in the preceding examples. They are externally plasticized.

A mixture of petroleum/water at 180° C. and at a pressure of 500 bar is circulated through these three flexible tubes. After being subjected to bending stress, it was quickly found that the tube of example 9 with PFA became significantly more rigid as a result of the relatively high creep of the PFA between the reinforcing 4.

Tubes 7 and 8 retained their properties.

EXAMPLES 10, 11 and 12

In these examples, the layers of the structure described in FIG. 1 are set out in table 3:

TABLE 3

| | Example | | |
|---|---|---|---|
| | 10 | 11 | 12 |
| Layer 2 | PE | — | — |
| Thickness (mm) | 5 mm | | |
| Layer 3 | plasticized PA11 | PE | plasticized PA11 |
| Thickness (mm) | 5 mm | 10 mm | 10 mm |

Example 10 is a dual layer of the invention consisting of:
an internal layer 2, made from an- ethylene-based polymer (average density PE) and alpha olefins,
an external layer 3, made from plasticized polyamide 11 sold by ELF ATOCHEM under the name of RILSAN (BESNO P40TL).

The PE of example 11 is the same as that used in example 10 and the RILSAN (PA11) is used only in example 12.

Water with a pH=2 was circulated through these three flexible tubes at 90° C. and 500 bar pressure. After being subjected to repeated bending stress, it was found after several months that the tube of example 12 made from RILSAN (PA11) had totally deteriorated chemically and that the tube of example 11 exhibited a relatively high degree of creep by the PE between the reinforcing 4, which made the tube more rigid. Only tube 10 retained its properties.

This example 10 relates more specifically to those applications proposed by the invention in which the effluent conveyed by the pipeline contains water and/or acids at an average temperature, i.e. approximately less than 90° C.

What is claimed is:

1. A reinforced flexible pipeline for conveying a petroleum effluent at pressure greater than 300 bar, the pipeline comprising a polymer sheath, and an unbonded layer of metallic reinforcing wires wound around the polymer sheath, wherein, in the layer of metallic reinforcing wires, there are jointing spaces between the metallic reinforcing wires, and wherein the polymer sheath has an internal surface which is in contact with an effluent and an external surface which is in contact with the metallic reinforcing wires when under pressure, wherein said sheath includes
   (1) an internal layer of a non-externally-plasticized thermoplastic polymer or copolymer selected from the group consisting of
      (a) a homopolymer of an alpha olefin or a copolymer of alpha olefins,
      (b) a polymer of vinylidene fluoride or a copolymer of vinylidene fluoride ($CF_2=CH_2$) and at least one monomer of the formula $CF_2=CFX$, wherein X is F, Cl, Br, $CF_3$, $C_2F_5$, $C_3F_7$, $C_4F_9$ or $C_5F_1$,
      (c) a copolymer of tetrafluoroethylene with monomers of the formula $CF_2=CF-O-R$, wherein R is $CF_3$, $C_2F_5$, $C_3F_7$, $C_4F_9$ or $C_5F_{11}$, (d) a copolymer of ethylene with tetrafluoroethylene (TFE) and chlorotrifluoroethylene (CTFE), and (e) a polyketone, and (2) an external layer of a thermoplastic polymer or copolymer having mechanical characteristics such that the external layer is able to withstand creep in the jointing spaces between the metallic reinforcing wires, the mechanical characteristics being defined as a shear modulus in excess of 30 MPa at temperatures of less than about 140° C. and a shear modulus of less than 1000 at temperatures greater than −20° C.

2. The pipeline as claimed in claim 1 wherein the shear modulus at temperatures greater that −20° C. is less than 700 MPa.

3. The pipeline as claimed in claim 1 wherein the external layer is made from an externally plasticized polymer or copolymer.

4. The pipeline as claimed in claim 3 in which said plasticized polymer or copolymer of the external layer is selected from the group consisting of: polyamide 11, polyamide 12, a polymer of vinylidene fluoride, and a copolymer of vinylidene fluoride $CF_2=CH_2$ and at least one monomer of the type $CF_2=CFX$, where X may be F, Cl, Br, $CF_3$, $C_2F_5$, $C_3F_7$, $C_4F_9$ or $C_5F_{11}$.

5. The pipeline as claimed in claim 1 wherein the material of the internal layer and the material of the external layer are selected as a pair from the paired groups consisting of (a) polyethylene (PE)(internal) with plasticized polyamine 11 or polyamide 12, (b) a copolymer of vinylidene fluoride and hexafluoropropylene (HFP) (internal) with plasticized polyamine 11 or polyamide 12 (external), (c) a copolymer of vinylidene fluoride and hexafluoropropylene (HFP) (internal) with plasticized polyvinylidene fluoride (PVDF) (external), (d) a copolymer of vinylidene fluoride and chorotrifluoroethylene (CTFE) (internal) with plasticized polyvinylidene fluoride (PVDF) (external), (e) perfluorocalcoxy (PFA) (internal) with plasticized polyvinylidene fluoride (PVDF) (external), and (f) perfluorocalcoxy (PFA) (internal) with plasticized polyamine 11 or polyamide 12 (external).

6. The pipeline of claim 1 wherein the pipeline transports effluent under pressure and at a temperature above 90° C.

* * * * *